US011915565B2

(12) United States Patent
Masuda

(10) Patent No.: US 11,915,565 B2
(45) Date of Patent: Feb. 27, 2024

(54) COMMODITY IMAGING APPARATUS, COMMODITY IMAGING METHOD, AND IMAGE RECOGNITION POS SYSTEM

(71) Applicant: NEC Platforms, Ltd, Kawasaki (JP)

(72) Inventor: Reo Masuda, Kanagawa (JP)

(73) Assignee: NEC Platforms, Ltd., Kanagawa (JP)

( * ) Notice: Subject to any disclaimer, the term of this patent is extended or adjusted under 35 U.S.C. 154(b) by 385 days.

(21) Appl. No.: 17/288,123

(22) PCT Filed: Oct. 3, 2019

(86) PCT No.: PCT/JP2019/039144
§ 371 (c)(1),
(2) Date: Apr. 23, 2021

(87) PCT Pub. No.: WO2020/095587
PCT Pub. Date: May 14, 2020

(65) Prior Publication Data
US 2021/0382378 A1 Dec. 9, 2021

(30) Foreign Application Priority Data
Nov. 5, 2018 (JP) .................................. 2018-207915

(51) Int. Cl.
*G07G 1/12* (2006.01)
*G03B 15/02* (2021.01)
(Continued)

(52) U.S. Cl.
CPC .............. *G07G 1/12* (2013.01); *G03B 15/02* (2013.01); *G03B 17/561* (2013.01); *G03B 29/00* (2013.01);
(Continued)

(58) Field of Classification Search
CPC ........ G07G 1/12; H04N 23/56; G03B 17/561; G03B 29/00; G06Q 20/208; G06V 10/147
(Continued)

(56) References Cited

U.S. PATENT DOCUMENTS 5,769,217 A * 6/1998 Derraugh ........... G11B 33/0427
206/311
7,909,248 B1 * 3/2011 Goncalves ........... G07G 1/0063
235/462.14
(Continued)

FOREIGN PATENT DOCUMENTS

CN 203217220 U 9/2013
CN 104570548 A 4/2015
(Continued)

OTHER PUBLICATIONS

CN Office Communication for CN Application No. 201980071247.3, dated Mar. 30, 2023 with English Translation.
(Continued)

*Primary Examiner* — James E Springer
(74) *Attorney, Agent, or Firm* — Sughrue Mion, PLLC

(57) ABSTRACT

A commodity imaging apparatus in which a camera does not protrude into a space above a commodity placement table is provided. A commodity imaging apparatus (10) includes a commodity placement table (1), a support pillar (2), and an imaging unit (3). The commodity placement table (1) includes a roughly square placement surface (1e). The support pillar (2) is disposed at one corner (1a) of the placement surface (1e). The imaging unit (3) is disposed in the support pillar (2) so as to take an image of a commodity (G1) placed on the placement surface (1e) from obliquely above the commodity (G1). A camera (31) of the imaging unit (3) does not protrude into a space above the commodity placement table (1).

9 Claims, 14 Drawing Sheets

(51) Int. Cl.
*G03B 17/56* (2021.01)
*G03B 29/00* (2021.01)
*G06Q 20/20* (2012.01)
*H04N 23/56* (2023.01)
*G06V 10/147* (2022.01)

(52) U.S. Cl.
CPC ........... *G06Q 20/208* (2013.01); *H04N 23/56* (2023.01); *G06V 10/147* (2022.01)

(58) Field of Classification Search
USPC .......................................................... 348/150
See application file for complete search history.

(56) References Cited

U.S. PATENT DOCUMENTS

| | | | |
|---|---|---|---|
| 9,256,775 | B1 | 2/2016 | Yasunaga |
| 2012/0268606 | A1 | 10/2012 | Liu |
| 2012/0327202 | A1 | 12/2012 | Nagamachi |
| 2017/0140360 | A1 | 5/2017 | Naito |

FOREIGN PATENT DOCUMENTS

| | | | |
|---|---|---|---|
| CN | 105043454 A | | 11/2015 |
| CN | 105938105 A | | 9/2016 |
| CN | 206594429 U | * | 10/2017 |
| CN | 206594429 U | | 10/2017 |
| CN | 107742318 A | | 2/2018 |
| CN | 207895560 U | | 9/2018 |
| JP | H10-105774 A | | 4/1998 |
| JP | 2003-101733 A | | 4/2003 |
| JP | 2004-266397 A | | 9/2004 |
| JP | 2004266397 A | * | 9/2004 |
| JP | 2013-008104 A | | 1/2013 |
| JP | 2014-092492 A | | 5/2014 |
| JP | 2016-052924 A | | 4/2016 |
| JP | 2016-105225 A | | 6/2016 |
| JP | 2016-119052 A | | 6/2016 |
| JP | 2016105225 A | * | 6/2016 |
| JP | 2017-091406 A | | 5/2017 |
| JP | 2017-220202 A | | 12/2017 |
| JP | 2017-220206 A | | 12/2017 |
| JP | 2018-085068 A | | 5/2018 |
| WO | 2018/020638 A1 | | 2/2018 |

OTHER PUBLICATIONS

International Search Report for PCT Application No. PCT/JP2019/039144, dated Nov. 12, 2019.
Japanese Office Action for JP Application No. 2018-207915, dated Jul. 2, 2019 with English Translation.
Japanese Office Action for JP Application No. 2018-207915, dated Aug. 13, 2019 with English Translation.
Japanese Office Action for JP Application No. 2019-160165, dated May 12, 2020 with English Translation.
Chinese Office Action for CN Application No. 201980071247.3 dated May 31, 2022 with English Translation.

* cited by examiner

COMMODITY IMAGING APPARATUS, COMMODITY IMAGING METHOD, AND IMAGE RECOGNITION POS SYSTEM

This application is a National Stage Entry of PCT/JP2019/039144 filed on Oct. 3, 2019, which claims priority from Japanese Patent Application 2018-207915 filed on Nov. 5, 2018, the contents of all of which are incorporated herein by reference, in their entirety.

TECHNICAL FIELD

The present invention relates to a commodity imaging apparatus, a commodity imaging method, and an image recognition POS system, and in particular to a commodity imaging apparatus, a commodity imaging method, and an image recognition POS system using a placement surface.

BACKGROUND ART

There is an image recognition apparatus that takes an image of a commodity by using a camera and thereby recognizes the commodity. Patent Literature 1 discloses an image recognition apparatus in which a camera is provided directly above a commodity, so that the commodity is recognized by taking an image of the commodity from directly above the commodity.

CITATION LIST

Patent Literature

Patent Literature 1: Japanese Unexamined Patent Application Publication No. 2017-220202

SUMMARY OF INVENTION

Technical Problem

The camera of such an image recognition apparatus is disposed at such a position that a user can perform an operation for registering a commodity. However, since the camera protrudes into the space above the commodity placement table, the user has a sense of being oppressed in some cases. Further, even when the camera is placed at a high position so that the user does not have a sense of being oppressed, the position of the camera becomes so high that the image recognition apparatus takes up a large space.

An object of the present disclosure is to provide a commodity imaging apparatus, a commodity imaging method, and an image recognition POS system in which a camera does not protrude into a space above a commodity placement table.

Solution to Problem

A commodity imaging apparatus according to an example embodiment of the present disclosure includes:
a commodity placement table including a roughly square placement surface;
a support pillar disposed at one corner of the placement surface; and an imaging unit disposed in the support pillar so as to take an image of a commodity placed on the placement surface from obliquely above the commodity.
A commodity imaging method according to an example embodiment of the present disclosure includes:
placing a commodity on a roughly square placement surface; and taking, by using an imaging apparatus disposed above one corner of the roughly square placement surface, an image of the commodity from obliquely above the commodity.

An image recognition POS system according to an example embodiment of the present disclosure includes:
a commodity imaging apparatus; and
a POS terminal apparatus connected to the commodity imaging apparatus through a wire or wirelessly so as to be able to communicate with the commodity imaging apparatus, the POS terminal apparatus being configured to perform a process for a settlement of a commodity purchased by a customer, in which
the commodity imaging apparatus includes:
a commodity placement table including a roughly square placement surface;
a support pillar disposed at one corner of the placement surface; and
an imaging unit disposed in the support pillar so as to take an image of a commodity placed on the placement surface from obliquely above the commodity.

Advantageous Effects of Invention

According to the present disclosure, it is possible to provide a commodity imaging apparatus, a commodity imaging method, and an image recognition POS system in which a camera does not protrude into a space above a commodity placement table.

DESCRIPTION OF EMBODIMENTS

First Example Embodiment

Figure 1:
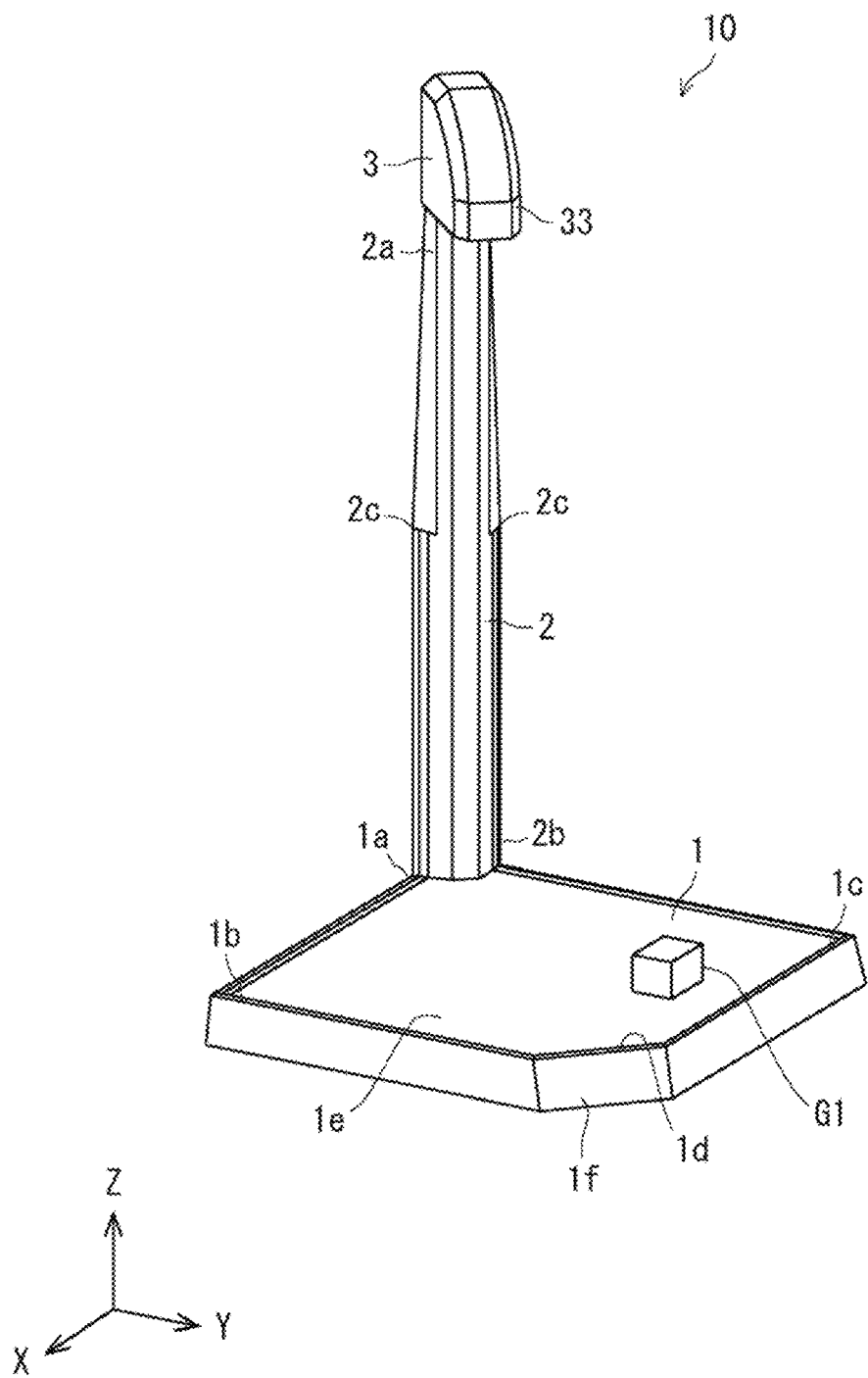
FIG. 1 is a perspective view showing an example of a commodity imaging apparatus according to a first example embodiment.
Figure 2:
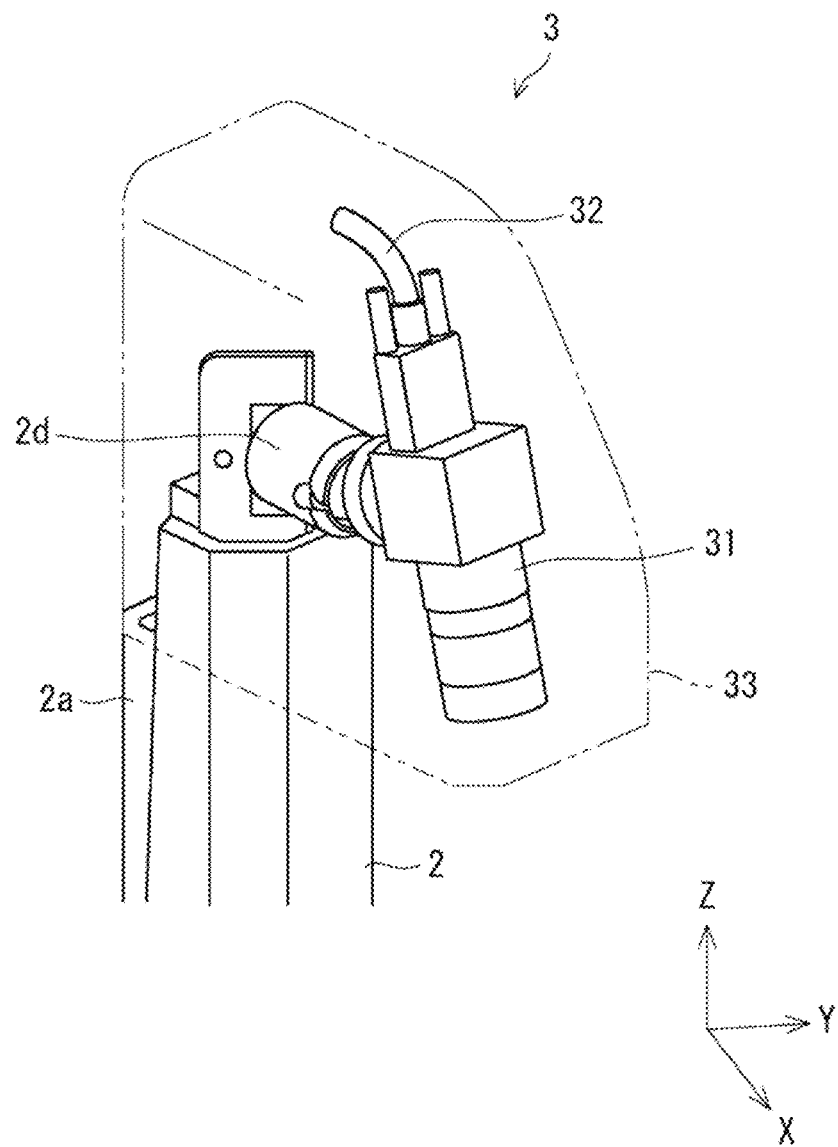
FIG. 2 is an enlarged perspective view drawn in a see-through manner, showing the main part of an example of the commodity imaging apparatus according to the first example embodiment.
Figure 3:
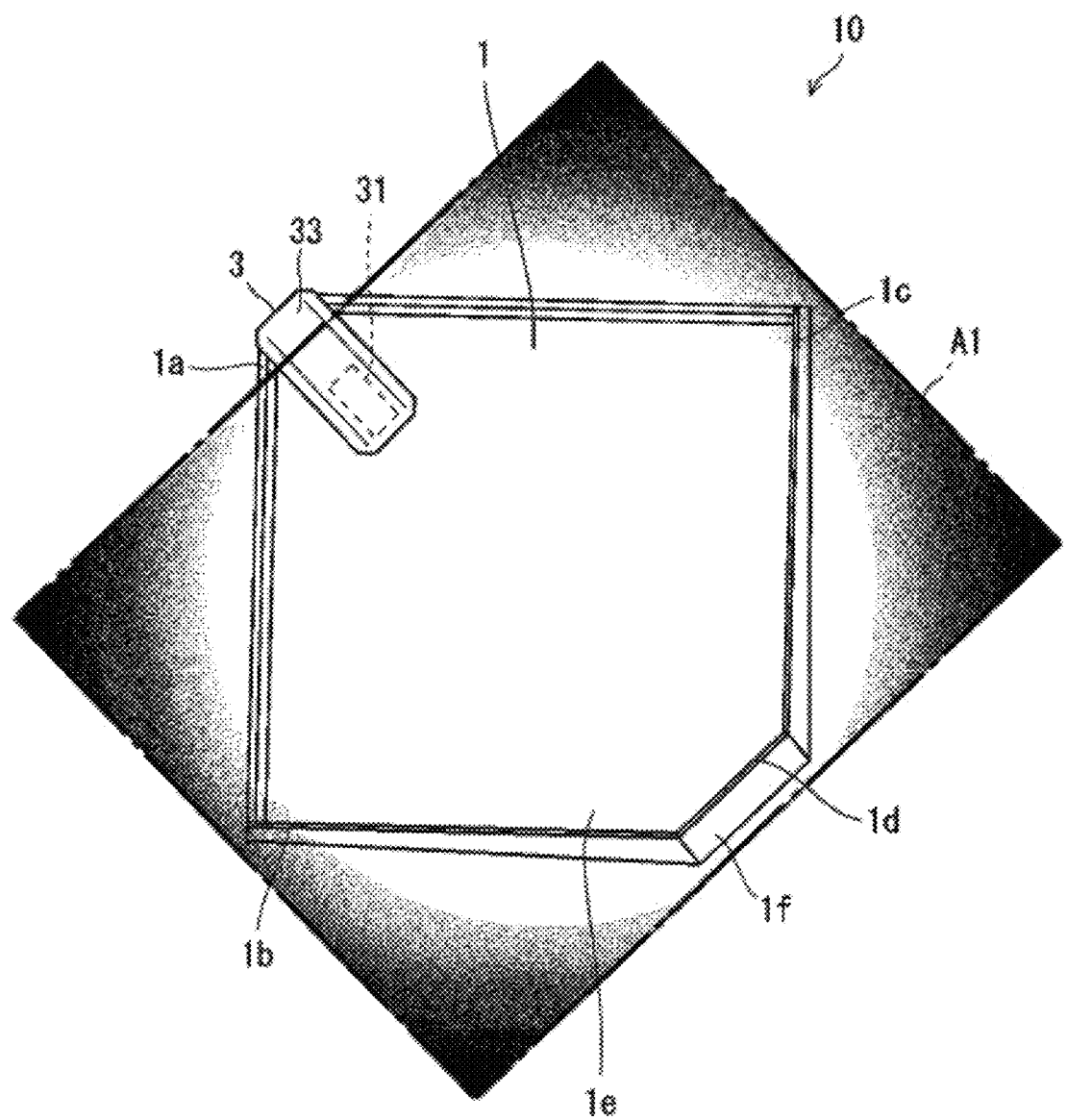
FIG. 3 is a plan view showing an imaging range of an example of the commodity imaging apparatus according to the first example embodiment.

A commodity imaging apparatus according to a first example embodiment will be described hereinafter with reference to FIGS. 1 to 3. FIG. 1 is a perspective view showing an example of a commodity imaging apparatus according to the first example embodiment. FIG. 2 is an enlarged perspective view drawn in a see-through manner, showing the main part of the example of the commodity imaging apparatus according to the first example embodiment. FIG. 3 is a plan view showing an imaging range of the example of the commodity imaging apparatus according to the first example embodiment.

As shown in FIG. 1, the commodity imaging apparatus 10 includes a commodity placement table 1, a support pillar 2, and an imaging unit 3. The commodity imaging apparatus 10 preferably further includes a box (not shown) containing a communication unit or the like that communicates with a control unit and/or a host apparatus (e.g., a POS terminal apparatus).

The commodity placement table 1 includes a roughly square plate-like placement surface 1e. The placement surface 1e is a roughly square flat surface having four corners 1a, 1b, 1c and 1d. The corner 1a corresponds to a corner diagonally opposite to the corner 1d, and the corner 1b corresponds to a corner diagonally opposite to the corner 1c. The corner 1d includes a cut-out part 1f. Although a commodity G1 is placed on the placement surface 1e shown in FIG. 1 as an example, the commodity is not limited to the commodity G1. That is, commodities having various sizes and various shapes can be placed on the placement surface 1e.

The support pillar 2 is disposed at the corner 1a of the placement surface 1e. The support pillar 2 includes a tip part 2a, a base part 2b, and an intermediate part 2c. In the support pillar 2, the base part 2b, the intermediate part 2c, and the tip part 2a are connected in this order, and the support pillar 2 extends upward from the corner 1a (in this example, extends towards the Z-axis positive side). The imaging unit 3 is disposed in the upper part of the support pillar 2 so that it can take an image of the commodity G1 placed on the placement surface 1e from obliquely above the commodity G1. As an example, the imaging unit 3 shown in FIG. 1 is disposed at the tip part 2a of the support pillar 2.

A display unit using LEDs (Light Emitting Diodes) as a light source or a display unit using an LCD (Liquid Crystal Display) may be provided in the cut-out part 1f of the commodity placement table 1. As shown in FIG. 2, the imaging unit 3 includes a camera 31, a cable 32, and a case 33. The illustration of a part of the cable 32 is omitted in the figure. The camera 31 is mechanically connected to the tip part 2a of the support pillar 2 through a connector 2d. The case 33 contains the camera 31 and the cable 32, and the camera 31 is preferably connected to a control apparatus, a storage device, a communication unit that communicates with a host apparatus, and the like through the cable 32.

As shown in FIGS. 1 and 2, the camera 31 is disposed above the corner 1a so as to take an image of the commodity G1 placed on the placement surface 1e from obliquely above the commodity G1. Therefore, the imaging unit 3 does not protrude into the space above the commodity placement table 1. Therefore, the imaging unit 3 is disposed at a position from which it can take an image of the commodity G1 placed on the placement surface 1e while securing a space having a predetermined size in the space above the commodity placement table 1.

As shown in FIG. 3, the camera 31 can take an image of a roughly rectangular imaging range A1. Each part in the imaging range A1 is shaded according to the degree of the distortion of that part in the image taken by the camera 31. Specifically, each part in the imaging range A1 is shaded in such a manner that the more the part in the taken image corresponding to that part is distorted, the more darkly that part is shaded. Further, the less the part in the taken image corresponding to that part is distorted, the more lightly that part is shaded. As shown by the dark shade in FIG. 3, the parts in the taken image corresponding to the four corners of the imaging range A1 are more distorted than the part in the taken image corresponding to the center of the imaging range A1 is.

Meanwhile, as described above, the placement surface 1e of the commodity imaging apparatus 10 has a roughly square shape, and as shown in FIGS. 1 and 2, the camera 31 is disposed at the tip part 2a of the support pillar 2 extending upward from the corner 1a of the placement surface 1e of the commodity placement table 1. Therefore, the placement surface 1e is positioned closer to the center of the imaging range A1 than the four corners of the imaging range A1 are.

As described above, according to the commodity imaging apparatus 10 in accordance with the first example embodiment, the imaging unit 3 is positioned above the corner 1a and does not protrude into the space above the commodity placement table 1. Therefore, even if a user performs an operation for registering a commodity G1 such as making the commodity imaging apparatus 10 take an image of the commodity G1, the imaging unit 3 does not interfere with the operation performed by the user. Further, even if the imaging unit 3 is positioned at the same height as the height of the user's face, it does not give the user a sense of being oppressed because the imaging unit 3 does not protrude into the space above the commodity placement table 1. Further, since the user's view in the horizontal direction is not obstructed, the user can have a wide view in the horizontal direction.

Further, as described above, the placement surface 1e of the commodity imaging apparatus 10 has a roughly square shape and the placement surface 1e is positioned closer to the center of the imaging range Al than the four corners of the imaging range A1 are. Therefore, the placement surface 1e is shown in a part in the taken image where the distortion is small. Therefore, the placement surface 1e is shown in the taken image and the distortion of the placement surface 1e in the taken image is small. Therefore, the camera 31 can take an image of the commodity G1 placed on the placement surface 1e with small distortion.

Second Example Embodiment

Figure 4:
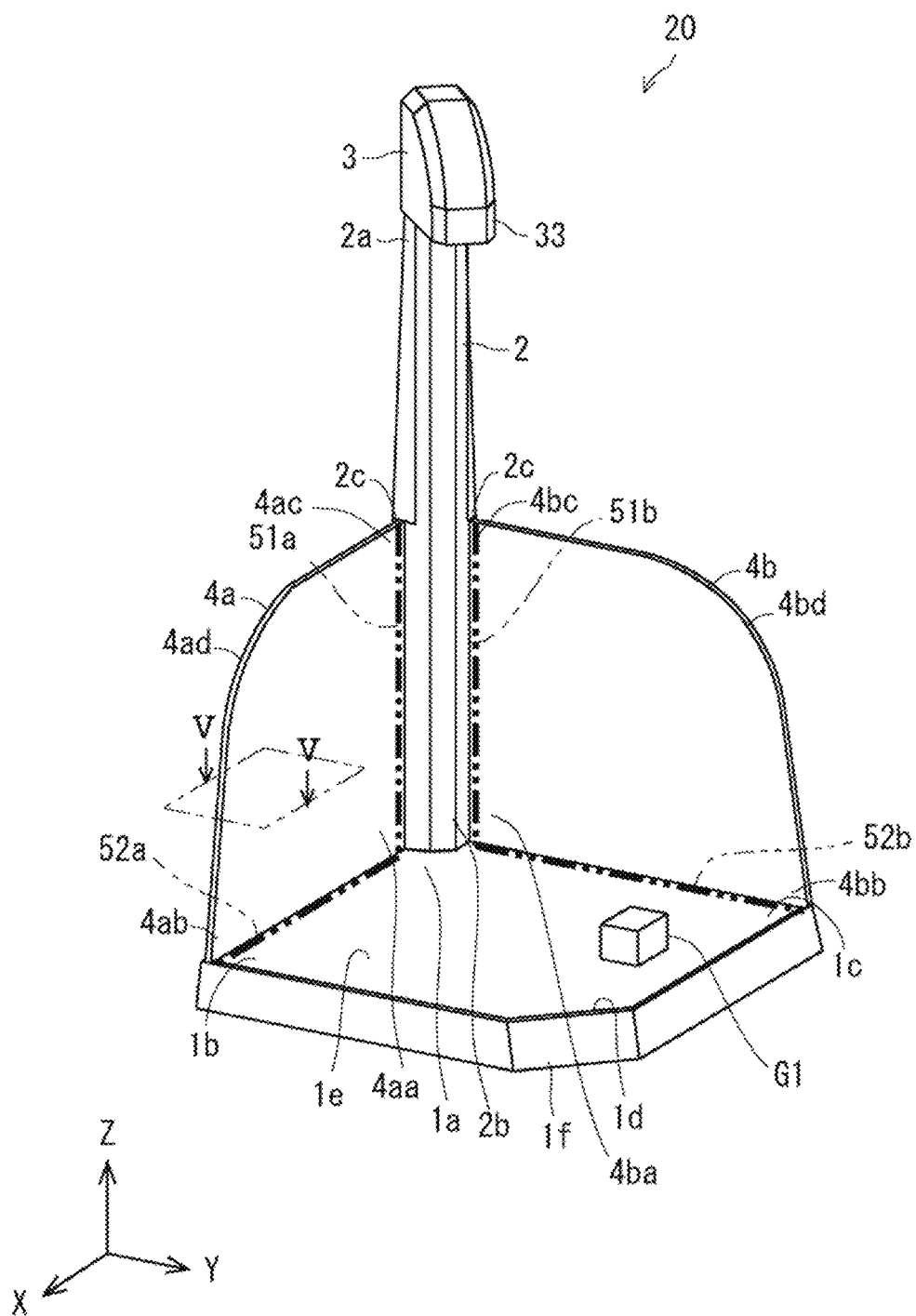
FIG. 4 is a perspective view showing an example of a commodity imaging apparatus according to a second example embodiment.
Figure 5:
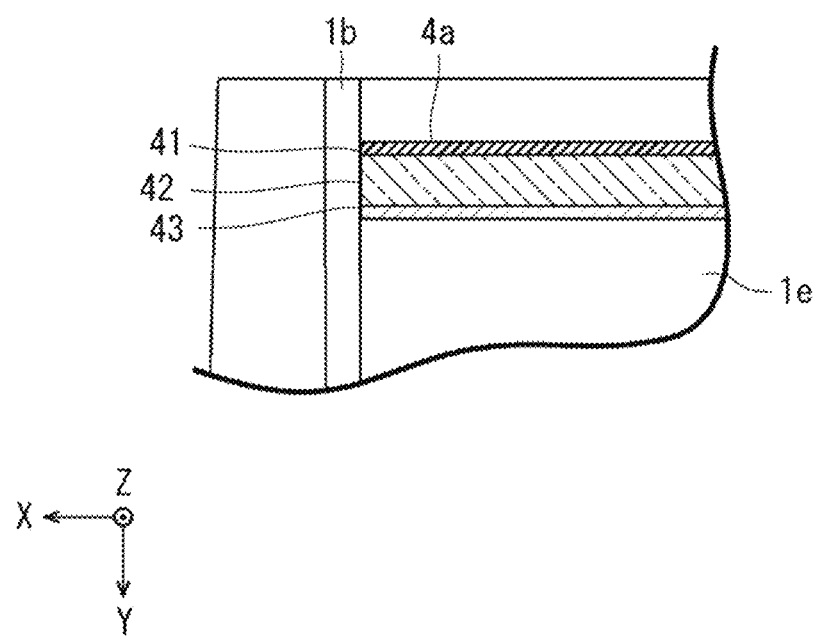
FIG. 5 is an enlarged cross-sectional view taken along a line V-V (see FIG. 4) showing a main part of an example of the commodity imaging apparatus according to the second example embodiment.

Next, a commodity imaging apparatus according to a second example embodiment will be described with reference to FIGS. 4 and 5. The commodity imaging apparatus according to the second example embodiment has the same configuration as that of the commodity imaging apparatus according to the first example embodiment except for its wall-like parts, light sources, and placement surface. Parts of the configuration different from those in the first example embodiment will be described hereinafter. FIG. 4 is a perspective view showing an example of the commodity imaging apparatus according to the second example embodiment. FIG. 5 is an enlarged cross-sectional view taken along a line V-V (see FIG. 4) showing a main part of an example of the commodity imaging apparatus according to the second example embodiment.

As shown in FIG. 4, the commodity imaging apparatus 20 includes wall-like parts 4a and 4b, and light sources 51a, 51b, 52a and 52b.

The wall-like parts 4a and 4b are provided on the placement surface 1e of the commodity placement table 1 and vertically extend upward from the placement surface 1e. Specifically, the wall-like part 4a vertically extends upward from one side of the placement surface 1e between the corners 1a and 1b thereof. An example of the wall-like part 4a shown in FIG. 4 is composed of a plate-like member. The upper end of the wall-like part 4a is positioned at the same height as a predetermined part of the intermediate part 2c of the support pillar 2. The wall-like part 4a and the support pillar 2 are preferably mechanically connected to each other. Similarly, the wall-like part 4b vertically extends upward from one side of the placement surface 1e between the corners 1a and 1c thereof. The upper end of the wall-like part 4b is positioned at the same height as the intermediate part 2c of the support pillar 2. The wall-like part 4b and the support pillar 2 are preferably mechanically connected to each other.

More specifically, the wall-like part 4a is composed of a roughly quadrangular plate, and includes three corners 4aa, 4ab and 4ac, and a curved part 4ad. The corner 4aa is in contact with the corner 1a of the placement surface 1e, and the corner 4ab is in contact with the corner 1b of the placement surface 1e.

The corner 4ac is in contact with the intermediate part 2c of the support pillar 2. The curved part 4ad is disposed at a position corresponding to a corner of the roughly rectangular plate diagonally opposite to the corner 4aa thereof. The curved part 4ad is positioned above the corner 1b of the placement surface 1e and is positioned on the corner 1b side of the intermediate part 2c of the support pillar 2. The curved part 4ad is preferably roundish.

The outer edge of the wall-like part 4a extends from the corner 4ac to the curved part 4ad along a roughly straight line, bends at the curved part 4ad along a predetermined curved line, and extends from the curved part 4ad to the corner 4ab along a roughly straight line.

Further, the wall-like part 4b is, more specifically, composed of a roughly quadrangular plate, and includes three corners 4ba, 4bb and 4bc, and a curved part 4bd. The corner 4ba is in contact with the corner 1a of the placement surface 1e, and the corner 4bb is in contact with the corner 1c of the placement surface 1e. The corner 4bc is in contact with the intermediate part 2c of the support pillar 2. The curved part 4bd is disposed at a position corresponding to a corner of the roughly rectangular plate diagonally opposite to the corner 4ba thereof. The curved part 4bd is positioned above the corner 1c of the placement surface 1e and is positioned on the corner 1c side of the intermediate part 2c of the support pillar 2. The curved part 4bd is preferably roundish.

The outer edge of the wall-like part 4b extends from the corner 4bc to the curved part 4bd along a roughly straight line, bends at the curved part 4bd along a predetermined curved line, and extends from the curved part 4bd to the corner 4bb along a roughly straight line.

As shown in FIG. 5, the wall-like part 4a includes a light shielding plate 41, a light guiding plate 42, and a light transmitting plate 43. The light shielding plate 41, the light guiding plate 42, and the light transmitting plate 43 are laminated on one another in this order. The light transmitting plate 43 is positioned on the side that faces the placement surface 1e side, and the light shielding plate 41 is positioned on the side that does not face the placement surface 1e side (i.e., on the outer side of the commodity imaging apparatus 20). The light guiding plate 42 is positioned between the light shielding plate 41 and the light transmitting plate 43. The light shielding plate 41 may be composed of any plate that blocks light, and the light transmitting plate 43 may be composed of any plate that lets light pass therethrough. The light guiding plate 42 may be composed of any plate that uniformly surface-emits light using light that is emitted from the light source 51a and enters the light guiding plate 42 from the end face thereof. For example, the light transmitting plate 43 is transparent or has a milky-white color, and may be formed by using an acrylic plate. It is preferred that the light shielding plate 41 blocks the whole light traveling from the outside of the commodity imaging apparatus 20 to the inside thereof. Note that the wall-like part 4b has the same structure as that of the wall-like part 4a. That is, the wall-like part 4b includes a light shielding plate 41, a light guiding plate 42, and a light transmitting plate 43. Note that the light shielding plate 41 may be a light shielding film.

As shown in FIGS. 4 and 5, the light source 51a is disposed between the light shielding plate 41 and the light transmitting plate 43 so as to be in contact with the end face of the light guiding plate 42 of the wall-like part 4a, and the light source 51b is disposed between the light shielding plate 41 and the light transmitting plate 43 so as to be in contact with the end face of the light guiding plate 42 of the wall-like part 4b. Specifically, the light source 51a is disposed on the support pillar 2 side of the light guiding plate 42 of the wall-like part 4a, and the light source 51b is disposed on the support pillar 2 side of the light guiding plate 42 of the wall-like part 4b. As an example, the light sources 51a and 51b shown in FIGS. 4 and 5 are disposed near the boundary between the light guiding plate 42 and the support pillar 2, and extends along the direction in which the support pillar 2 extends (in this example, in the Z-axis direction). In this example, the light source 51a preferably extends from the corner 4ac to the corner 4aa. In this example, the light source 51b preferably extends from the corner 4bc to the corner 4ba. For each of the light sources 51a and 51b, for example, one in which a plurality of LEDs are disposed inside an LED holding part (not shown) is used. This LED holding part is a string-like member with a groove formed therein, and specifically the string-like member has a U-shape in cross section. Specifically, the plurality of LEDs are disposed inside the groove. This LED holding part is formed of a material having a light shielding property, and light is emitted only from an opened side of the groove of the LED holding part. The light sources 51a and 51b are disposed so that the openings of the grooves of the LED holding parts are in contact with the end faces of the light guiding plates 42 of the wall-like parts 4a and 4b, respectively. Each of the light sources 51a and 51b provides light onto the placement surface 1e through the light guiding plate 42 and the light transmitting plate 43. Specifically, the light sources 51a and 51b can provide light onto the placement surface 1e from substantially the entire areas of the main surfaces on the placement surface 1e side of the wall-like parts 4a and 4b, respectively. Further, the wall-like part 4a is disposed on one side between the corners 1a and 1b, and the wall-like part 4b is disposed on one side between the corners 1a and 1c.

The light sources 52a and 52b are incorporated into the commodity placement table 1, and specifically disposed inside the commodity placement table 1. More specifically, the light source 52a is disposed near a connection part between the placement surface 1e and the wall-like part 4a inside the commodity placement table 1, and extends from the corner 1a to the corner 1b along the wall-like part 4a. Further, the light source 52b is disposed near a connection part between the placement surface 1e and the wall-like part 4b inside the commodity placement table 1, and extends from the corner 1a to the corner 1c along the wall-like part 4b. Similarly to the light sources 51a and 51b, for each of the light sources 52a and 52b, for example, one in which a plurality of LEDs are disposed inside an LED holding part (not shown) is used. This LED holding part is a string-like member with a groove formed therein, and specifically the string-like member has a U-shape in cross section. Specifically, the plurality of LEDs are disposed inside the groove. This LED holding part is formed of a material having a light shielding property, and light is emitted only from an opened side of the groove of the LED holding part. Further, the plate having the placement surface 1e is composed of a light transmitting plate that lets light pass therethrough and a light guiding plate, and these plates are laminated on one another. The light transmitting plate is positioned above the light guiding plate. The light sources 52a and 52b are positioned below the light transmitting plates, and the openings of the grooves of the LED holding parts of the light sources 52a and 52b are disposed so as to be in contact with the end faces of the light guiding plates. A light shielding plate is provided below the light guiding plates so that no light leaks from below the commodity placement table 1.

By the above-described configuration, the commodity imaging apparatus 20 according to the second example embodiment provides advantageous effects similar to those of the commodity imaging apparatus 10. Specifically, the imaging unit 3 is positioned above the corner 1a and does not protrude into the space above the commodity placement table 1 as in the case of the commodity imaging apparatus 10. Therefore, even if a user performs an operation for registering a commodity G1 such as making the commodity imaging apparatus 20 take an image of the commodity G1, the imaging unit 3 does not interfere with the operation performed by the user. Further, even if the imaging unit 3 is positioned at the same height as the height of the user's face, it does not give the user a sense of being oppressed because the imaging unit 3 does not protrude into the space above the commodity placement table 1. Further, since the user's view in the horizontal direction is not obstructed, the user can have a wide view in the horizontal direction.

Further, as described above, similarly to the commodity imaging apparatus 10, the placement surface 1e of the commodity imaging apparatus 20 has a roughly square shape and the placement surface 1e is positioned closer to the center of the imaging range A1 than the four corners of the imaging range A1 are. Therefore, the placement surface 1e is shown in a part in the taken image where the distortion is small. Therefore, the placement surface 1e is shown in the taken image and the distortion of the placement surface 1e in the taken image is small. Therefore, the camera 31 can take an image of the commodity G1 placed on the placement surface 1e with small distortion.

Further, the commodity imaging apparatus 20 includes wall-like parts 4a and 4b, and the light shielding plates 41 of the wall-like parts 4a and 4b block light coming from the outside of the commodity imaging apparatus 20. Therefore, it is possible to reduce the influence of external light onto the surface of the commodity G1 photographed by the camera 31, i.e., onto the surface of the commodity G1 that faces in the shooting direction of the camera 31 disposed in the upper side of the support pillar 2. As a result, it is possible to reduce the rate of occurrences of mis-recognition in which a commodity is mistakenly recognized.

Further, in the commodity imaging apparatus 20, the light guiding plates 42 and the light transmitting plates 43 of the wall-like parts 4a and 4b guide light emitted from the light sources 51a and 51b to the placement surface 1e. Therefore, it is possible to provide an amount of light suitable for the imaging onto the placement surface 1e.

Further, the commodity imaging apparatus 20 includes the light sources 52a and 52b. Further, the plate having the placement surface 1e is composed of the light transmitting plate that lets light pass therethrough and the light guiding plate. These plates are laminated on one another. The light transmitting plate is positioned above the light guiding plate. Therefore, the light sources 52a and 52b provide light onto the placement surface 1e through the light transmitting plates and the light guiding plates. Note that the light sources 52a and 52b can provide light from substantially the entire surface of the placement surface 1e. Further, the light sources 52a and 52b can provide an amount of light suitable for the imaging.

Third Example Embodiment

Figure 6:
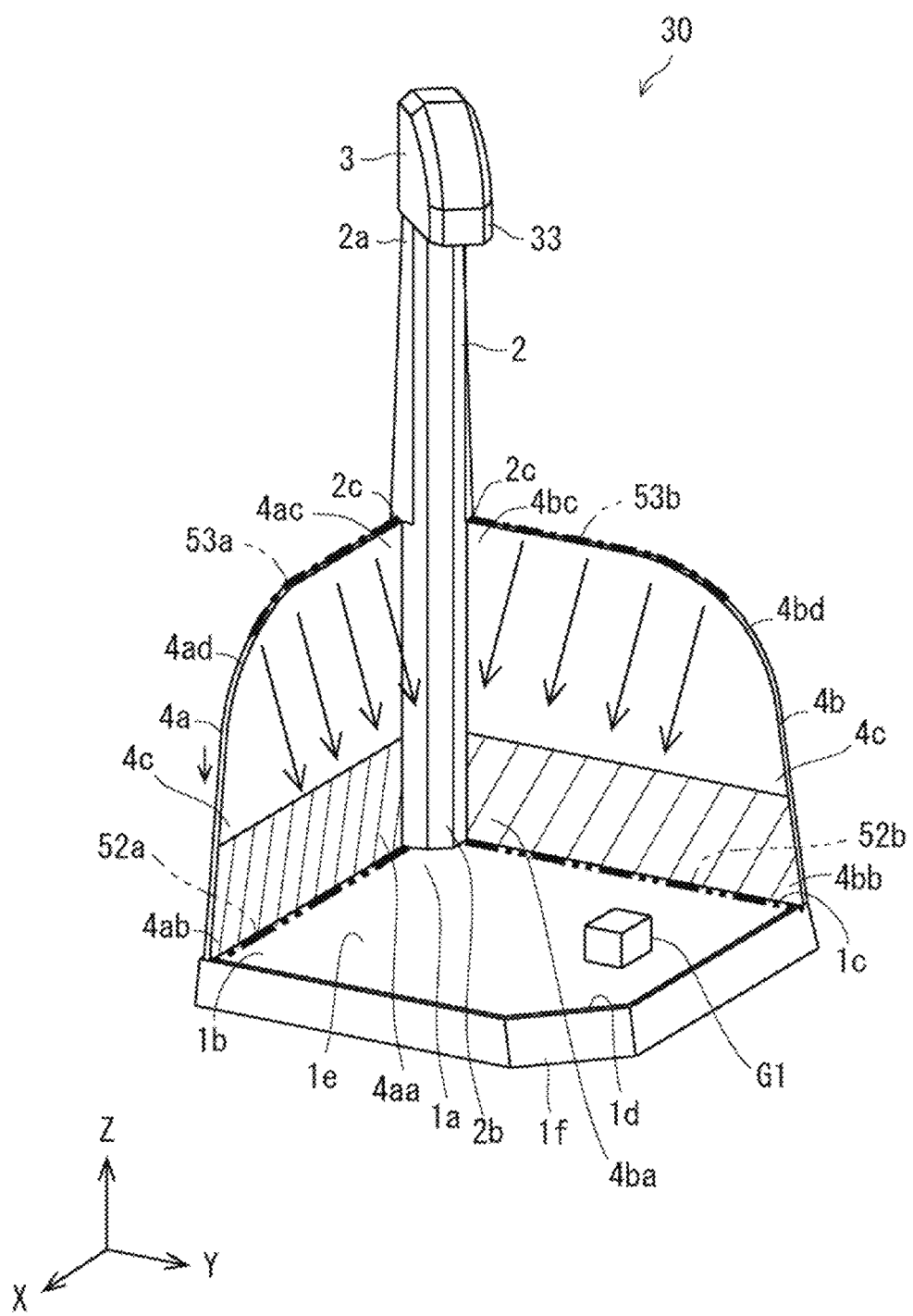
FIG. 6 is a perspective view showing an example of a commodity imaging apparatus according to a third example embodiment.
Figure 7:
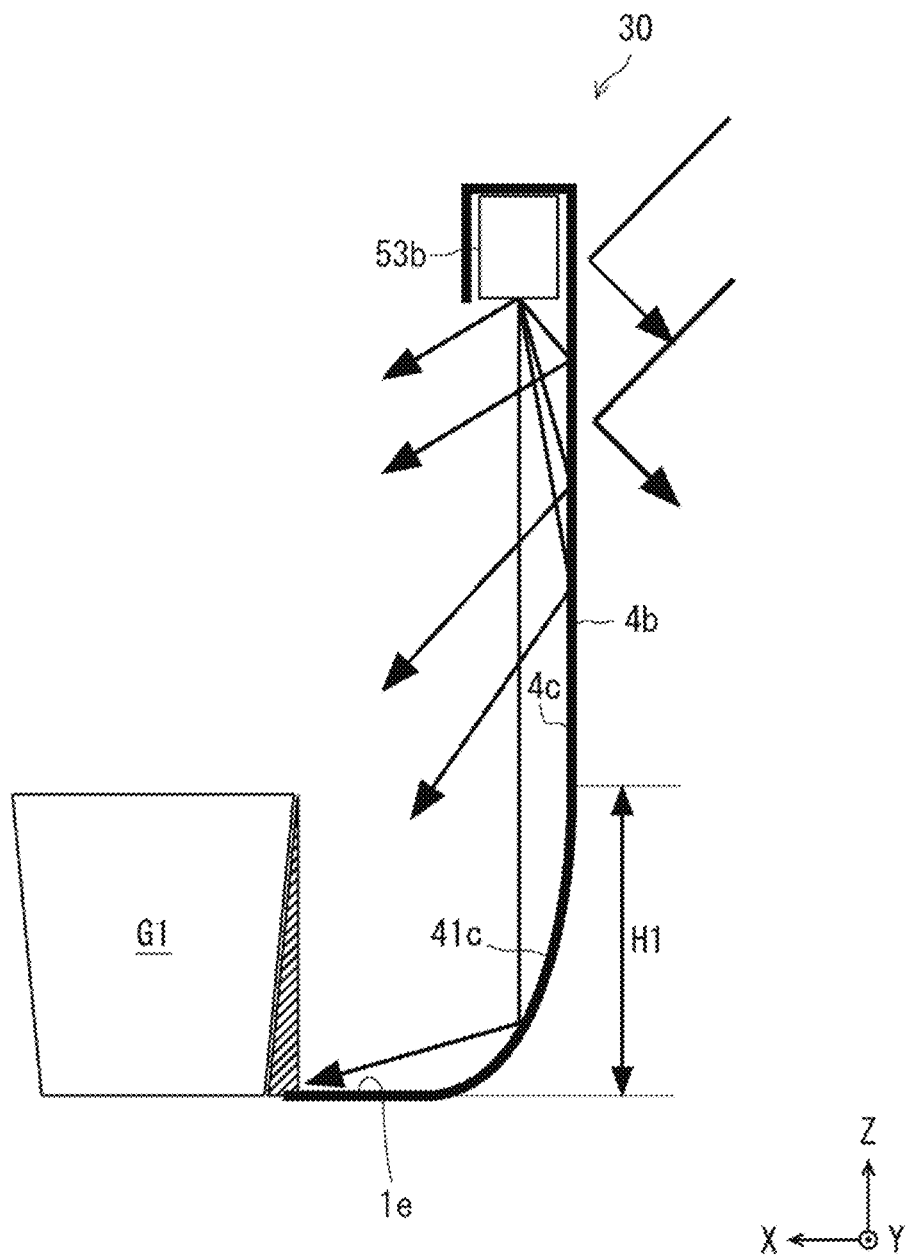
FIG. 7 is a schematic cross-sectional view showing a main part of an example of the commodity imaging apparatus according to the third example embodiment.

Next, a commodity imaging apparatus according to a third example embodiment will be described with reference to FIGS. 6 and 7. The commodity imaging apparatus according to the third example embodiment has the same configuration as that of the commodity imaging apparatus according to the second example embodiment except for its wall-like parts 4a and 4b and light sources 53a and 53b. Parts of the configuration different from those in the second example embodiment will be mainly described hereinafter. FIG. 6 is a perspective view showing an example of a commodity imaging apparatus according to the third example embodiment. FIG. 7 is a schematic cross-sectional view showing a main part of an example of the commodity imaging apparatus according to the third example embodiment.

As shown in FIG. 6, the commodity imaging apparatus 30 includes wall-like parts 4a and 4b, and light sources 53a and 53b. For each of the light sources 53a and 53b, for example, one in which a plurality of LEDs are disposed inside an LED holding part (not shown) is used. This LED holding part is a string-like member with a groove formed therein, and specifically the string-like member has a U-shape in cross section. Specifically, the plurality of LEDs are disposed inside the groove. This LED holding part is formed of a material having a light shielding property, and light is emitted only from an opened side of the groove of the LED holding part. Note that the wall-like parts 4a and 4b in FIG. 6 are not entirely flat, though it is shown as flat components in the figure. Hatched parts in the lower parts of the wall-like parts 4a and 4b in FIG. 6 indicate parts that are composed of curved surfaces or inclined flat surface. In the third example embodiment, the hatched parts are composed of concave curved-surface parts 41c. In the later-described fourth example embodiment, the hatched parts are composed of convex curve-surface parts 42c, and in the later-described fifth example embodiment, the hatched parts are composed of inclined flat-surface parts 43c.

As shown in FIG. 7, the wall-like part 4b blocks external light and includes a reflecting surface 4c disposed on the placement surface 1e side. Further, the reflecting surface 4c includes a concave curved-surface part 41c. The concave curved-surface part 41c is curved and recessed from the placement surface 1e toward the outside of the commodity imaging apparatus 30. The concave curved-surface part 41c is seamlessly connected to the placement surface 1e. A height H1 of the concave curved-surface part 41c is a height from the placement surface 1e to the upper end of the concave curved-surface part 41c. The height H1 is preferably determined according to the size of the commodity G1 to be photographed and is, for example, 15 cm or about a quarter of the height of the wall-like part 4b.

Similarly to the wall-like part 4b, the wall-like part 4a blocks external light and includes a reflecting surface 4c. Further, the reflecting surface 4c includes a concave curved-surface part 41c. Further, the reflecting surface 4c reflects light coming from the light sources 53a and 53b.

As shown in FIG. 6, the light source 53a is disposed in the upper part of the wall-like part 4a, specifically, is disposed at the upper end of the wall-like part 4a, and extends from the corner 4ac to the middle of the curved part 4ad.

The light source 53b is disposed in the upper part of the wall-like part 4b, specifically, is disposed at the upper end of the wall-like part 4b, and extends from the corner 4bc to the middle of the curved part 4bd.

Note that as shown in FIG. 7, the light source 53b emits light. Then, a part of the light emitted from the light source 53b travels to the placement surface 1e and is provided onto the commodity G1 and its periphery. Further, the remaining part of the light is incident on the wall-like part 4b and reflects therefrom, or travels in a straight line. The light that travels downward in a straight line is incident on the concave curved-surface part 41c and reflected therefrom, and reaches the bottom surface of the commodity G1 and the bottom side of the side surface of the commodity G1.

Further, since the example of the commodity G1 shown in FIG. 7 has such a shape that it is tapered from the upper end toward the bottom, a shadow is formed on the bottom surface of the commodity G1 or on the bottom side of the side surface of the commodity G1. However, it is possible to apply light emitted from the light source 53b to the bottom surface of the commodity G1 and the bottom side of the side surface of the commodity G1, and thereby to brightly illuminate the shadow thereof.

As described above, the commodity imaging apparatus 30 according to the third example embodiment includes the light sources 53a and 53b. The light sources 53a and 53b emit light, and the reflecting surfaces 4c of the wall-like parts 4a and 4b reflect the light emitted from the light sources 53a and 53b toward the placement surface 1e. Therefore, it is possible to provide an amount of light suitable for the imaging onto the placement surface 1e.

Further, as described above, a part of the light from the light sources 53a and 53b travels to the placement surface 1e and is provided onto the commodity G1 and its periphery. Further, the remaining part of the light is incident on the wall-like part 4b and reflects therefrom, or travels in a straight line. The light that travels downward in a straight line is incident on the concave curved-surface part 41c and reflected therefrom, and reaches the bottom surface of the commodity G1 and the bottom side of the side surface of the commodity G1. Therefore, it is possible to brightly illuminate the shadows of the bottom surface of the commodity G1 and the bottom side of the side surface of the commodity G1. It is possible to reduce the rate of occurrences of misrecognition of commodities even further.

Further, the commodity imaging apparatus 30 provides advantageous effects similar to those of the commodity imaging apparatus 10 (see FIGS. 1 and 2). Specifically, the imaging unit 3 is positioned above the corner 1a and does not protrude into the space above the commodity placement table 1 as in the case of the commodity imaging apparatus 10. Therefore, even if a user performs an operation for registering a commodity G1 such as making the commodity imaging apparatus 30 take an image of the commodity G1, the imaging unit 3 does not interfere with the operation performed by the user. Further, even if the imaging unit 3 is positioned at the same height as the height of the user's face, it does not give the user a sense of being oppressed because the imaging unit 3 does not protrude into the space above the commodity placement table 1. Further, since the user's view in the horizontal direction is not obstructed, the user can have a wide view in the horizontal direction.

Further, as described above, similarly to the commodity imaging apparatus 10, the placement surface 1e of the commodity imaging apparatus 30 has a roughly square shape and the placement surface 1e is positioned closer to the center of the imaging range A1 than the four corners of the imaging range A1 are. Therefore, the placement surface 1e is shown in a part in the taken image where the distortion is small. Therefore, the placement surface 1e is shown in the taken image and the distortion of the placement surface 1e in the taken image is small. Therefore, the camera 31 (see FIG. 2) can take an image of the commodity G1 placed on the placement surface 1e with small distortion.

Similarly to the commodity imaging apparatus 20 (see FIG. 4), the commodity imaging apparatus 30 includes wall-like parts 4a and 4b, and the wall-like parts 4a and 4b block light from the outside. Therefore, it is possible to reduce the influence of external light onto the surface of the commodity G1 photographed by the camera 31, i.e., onto the surface of the commodity G1 that faces in the shooting direction of the camera 31 disposed in the upper side of the support pillar 2.

Further, similarly to the commodity imaging apparatus 20, the commodity imaging apparatus 30 includes the light sources 52a and 52b. Further, the plate having the placement surface 1e is composed of the light transmitting plate that lets light pass therethrough and the light guiding plate. These plates are laminated on one another. The light transmitting plate is positioned above the light guiding plate. Therefore, the light sources 52a and 52b provide light onto the placement surface 1e through the light transmitting plates and the light guiding plates. Note that the light sources 52a and 52b can provide light from substantially the entire surface of the placement surface 1e. Further, the light sources 52a and 52b can provide an amount of light suitable for the imaging. Note that the commodity imaging apparatus 30 does not necessarily have to include the light sources 52a and 52b, the light transmitting plate, and the light guiding plate.

Fourth Example Embodiment

Figure 8:
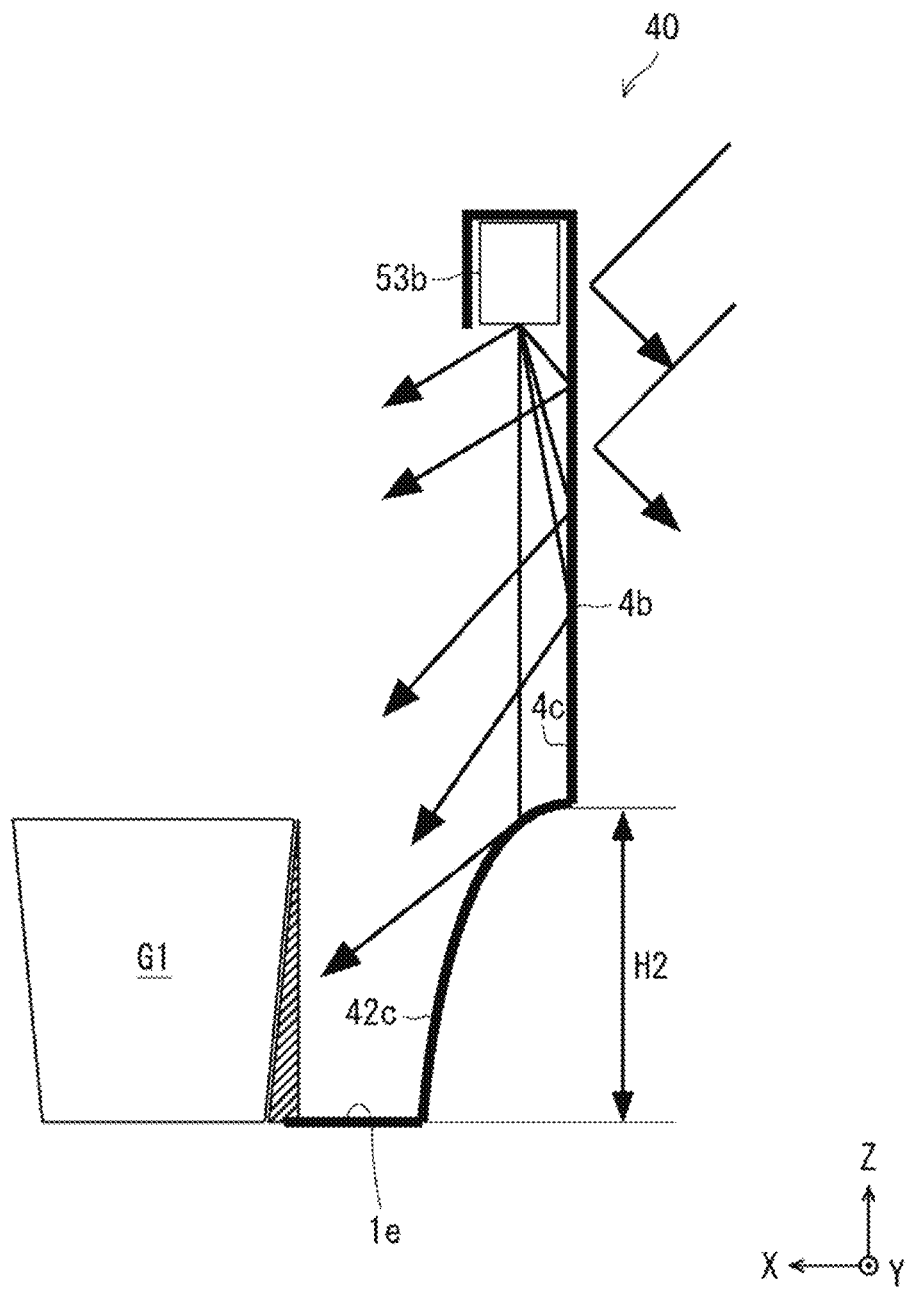
FIG. 8 is a schematic cross-sectional view showing a main part of an example of a commodity imaging apparatus according to a fourth example embodiment.

Next, a commodity imaging apparatus according to a fourth example embodiment will be described with reference to FIG. 8. The commodity imaging apparatus according to the fourth example embodiment has the same configuration as that of the commodity imaging apparatus according to the third example embodiment except that its wall-like parts 4a and 4b include convex curved-surface parts 42c. Parts of the configuration different from those in the third example embodiment will be mainly described hereinafter. FIG. 8 is a schematic cross-sectional view showing a main part of an example of a commodity imaging apparatus according to the fourth example embodiment.

As shown in FIG. 8, the wall-like part 4b blocks external light and includes a reflecting surface 4c. Further, the reflecting surface 4c includes a convex curved-surface part 42c. The convex curved-surface part 42c is curved and protrudes from the outside of the commodity imaging apparatus 30 toward the placement surface 1e side. The convex curved-surface part 42c is connected to the placement surface 1e. A height H2 of the convex curved-surface part 42c is a height from the placement surface 1e to the upper end of the convex curved-surface part 42c. The height H2 is preferably determined according to the size of the commodity G1 to be photographed and is, for example, 15 cm or about a quarter of the height of the wall-like part 4b.

Similarly to the wall-like part 4b, the wall-like part 4a blocks external light and includes a reflecting surface 4c. Further, the reflecting surface 4c includes the convex curved-surface part 42c. Further, the reflecting surface 4c reflects light coming from the light sources 53a and 53b.

As shown in FIG. 8, the light source 53b emits light. Then, a part of the light emitted from the light source 53b travels to the placement surface 1e and is provided onto the commodity G1 and its periphery. Further, the remaining part of the light is incident on the wall-like part 4b and reflects therefrom, or travels in a straight line. The light that travels downward in a straight line is incident on the convex curved-surface part 42c and reflected therefrom, and reaches the bottom surface of the commodity G1 and the bottom side of the side surface of the commodity G1.

Further, since the example of the commodity G1 shown in FIG. 8 has such a shape that it is tapered from the upper end toward the bottom, a shadow is formed on the bottom surface of the commodity G1 or on the bottom side of the side surface of the commodity G1. However, it is possible to apply light emitted from the light source 53b to the bottom surface of the commodity G1 and the bottom side of the side surface of the commodity G1, and thereby to brightly illuminate the shadow thereof.

As described above, the commodity imaging apparatus 40 according to the fourth example embodiment includes the light sources 53a and 53b. The light sources 53a and 53b emit light, and the reflecting surfaces 4c of the wall-like parts 4a and 4b reflect the light emitted from the light sources 53a and 53b toward the placement surface 1e. Therefore, it is possible to provide an amount of light suitable for the imaging onto the placement surface 1e.

Further, as described above, a part of the light from the light sources 53a and 53b travels to the placement surface 1e and is provided onto the commodity G1 and its periphery. Further, the remaining part of the light is incident on the wall-like part 4b and reflects therefrom, or travels in a straight line. The light that travels downward in a straight line is incident on the convex curved-surface part 42c and reflected therefrom, and reaches the bottom surface of the commodity G1 and the bottom side of the side surface of the commodity G1. Therefore, it is possible to brightly illuminate the shadows of the bottom surface of the commodity G1 and the bottom side of the side surface of the commodity G1. It is possible to reduce the rate of occurrences of misrecognition of commodities even further.

Further, the commodity imaging apparatus 40 provides advantageous effects similar to those of the commodity imaging apparatus 30 (see FIG. 7). Note that the commodity imaging apparatus 40 does not necessarily have to include the light sources 52a and 52b, the light transmitting plate, and the light guiding plate.

Fifth Example Embodiment

Figure 9:
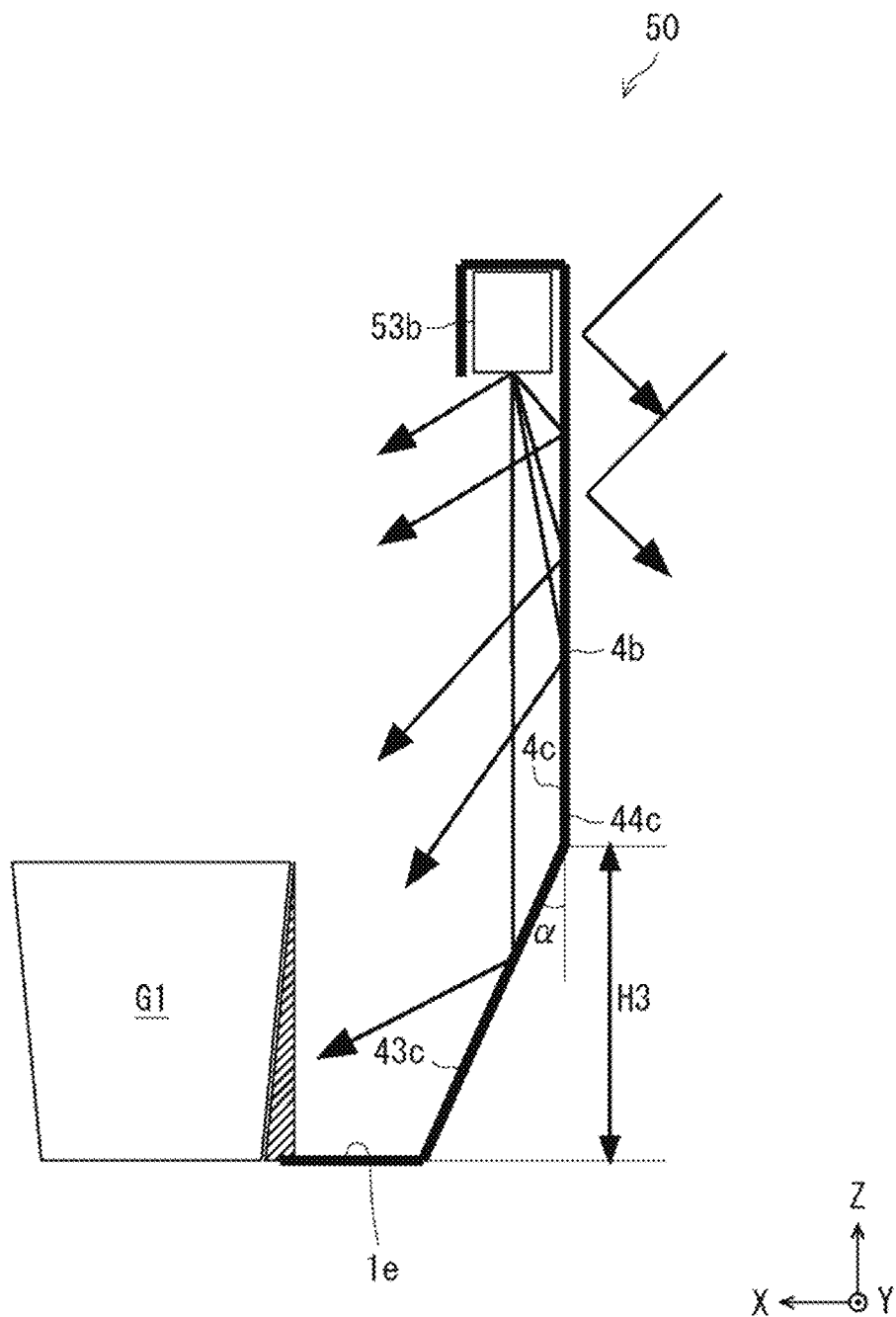
FIG. 9 is a schematic cross-sectional view showing a main part of an example of a commodity imaging apparatus according to a fifth example embodiment.

Next, a commodity imaging apparatus according to a fifth example embodiment will be described with reference to FIG. 9. The commodity imaging apparatus according to the fifth example embodiment has the same configuration as that of the commodity imaging apparatus according to the third example embodiment except that its wall-like parts 4a and 4b include inclined flat-surface parts 43c. Parts of the configuration different from those in the third example embodiment will be mainly described hereinafter. FIG. 9 is a schematic cross-sectional view showing a main part of an example of a commodity imaging apparatus according to the fifth example embodiment.

As shown in FIG. 9, the wall-like part 4b blocks external light and includes a reflecting surface 4c. Further, the reflecting surface 4c includes a flat-surface part 44c and an inclined flat-surface part 43c. The inclined flat-surface part 43c extends from the flat-surface part 44c and is connected to the placement surface 1e. The inclined flat-surface part 43c is inclined from the outside of the commodity imaging apparatus 30 toward the placement surface 1e side. An angle α by which the inclined flat-surface part 43c is inclined from the flat-surface part 44c is, for example, 30 to 45 degrees. A height H3 of the inclined flat-surface part 43c is a height from the placement surface 1e to the upper end of the inclined flat-surface part 43c. The height H3 is preferably determined according to the size of the commodity G1 to be photographed and is, for example, 15 cm or about a quarter of the height of the wall-like part 4b.

Similarly to the wall-like part 4b, the wall-like part 4a blocks external light and includes a reflecting surface 4c. Further, the reflecting surface 4c includes the flat-surface part 44c and the inclined flat-surface part 43c. Further, the reflecting surface 4c reflects light coming from the light sources 53a and 53b.

As shown in FIG. 9, the light source 53b emits light. Then, a part of the light emitted from the light source 53b travels to the placement surface 1e and is provided onto the commodity G1 and its periphery. Further, the remaining part of the light is incident on the wall-like part 4b and reflects therefrom, or travels in a straight line. The light that travels downward in a straight line is incident on the inclined flat-surface part 43c and reflected therefrom, and reaches the bottom surface of the commodity G1 and the bottom side of the side surface of the commodity G1.

Further, since the example of the commodity G1 shown in FIG. 9 has such a shape that it is tapered from the upper end toward the bottom, a shadow is formed on the bottom surface of the commodity G1 or on the bottom side of the side surface of the commodity G1. However, it is possible to apply light emitted from the light source 53b to the bottom surface of the commodity G1 and the bottom side of the side surface of the commodity G1, and thereby to brightly illuminate the shadow thereof.

As described above, the commodity imaging apparatus 50 according to the fifth example embodiment includes the light sources 53a and 53b. The light sources 53a and 53b emit light, and the reflecting surfaces 4c of the wall-like parts 4a and 4b reflect the light emitted from the light sources 53a and 53b toward the placement surface 1e. Therefore, it is possible to provide an amount of light suitable for the imaging onto the placement surface 1e.

Further, as described above, a part of the light from the light sources 53a and 53b travels to the placement surface 1e and is provided onto the commodity G1 and its periphery. Further, the remaining part of the light is incident on the wall-like part 4b and reflects therefrom, or travels in a straight line. The light that travels downward in a straight line is incident on the inclined flat-surface part 43c and reflected therefrom, and reaches the bottom surface of the commodity G1 and the bottom side of the side surface of the commodity G1. Therefore, it is possible to brightly illuminate the shadows of the bottom surface of the commodity G1 and the bottom side of the side surface of the commodity G1. It is possible to reduce the rate of occurrences of misrecognition of commodities even further.

Further, the commodity imaging apparatus 50 according to the fifth example embodiment provides advantageous effects similar to those of the commodity imaging apparatus 30 (see FIG. 7). Note that the commodity imaging apparatus 50 does not necessarily have to include the light sources 52a and 52b, the light transmitting plate, and the light guiding plate.

Figure 10:
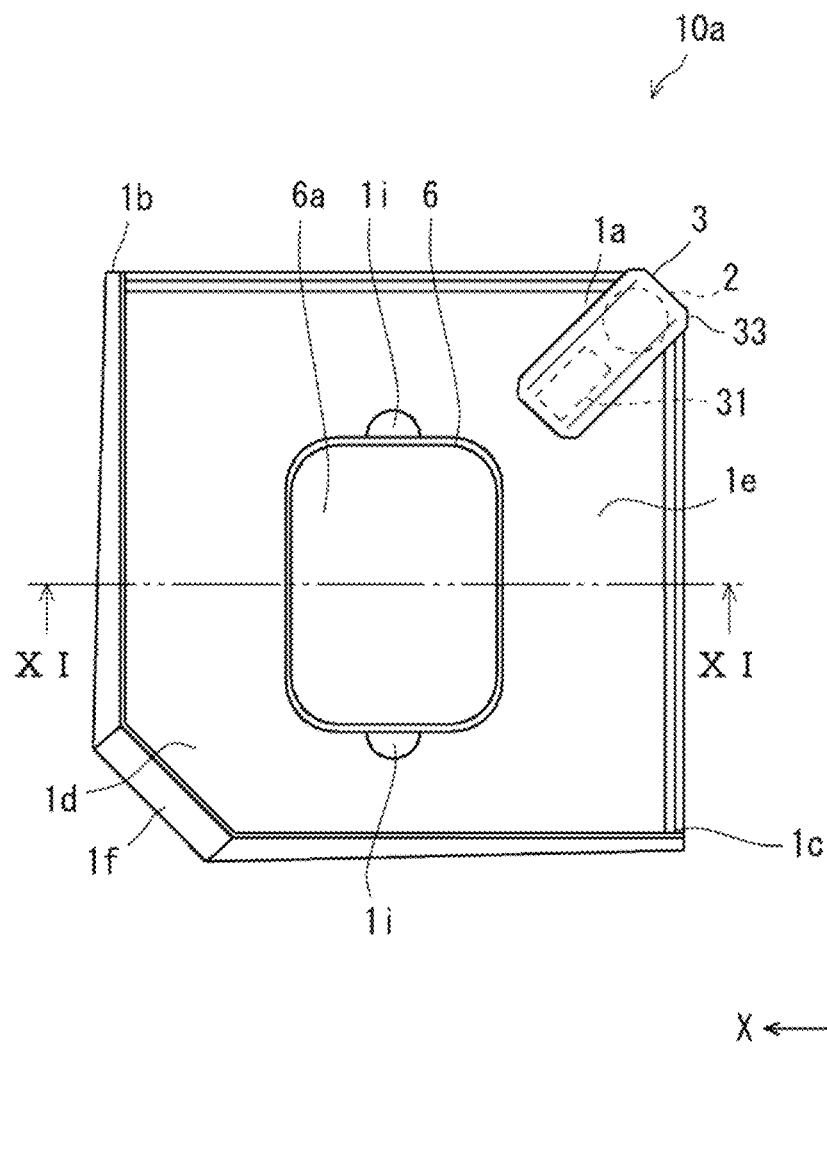
FIG. 10 is a plan view showing a modified example of the commodity imaging apparatus according to the first example embodiment.
Figure 11:
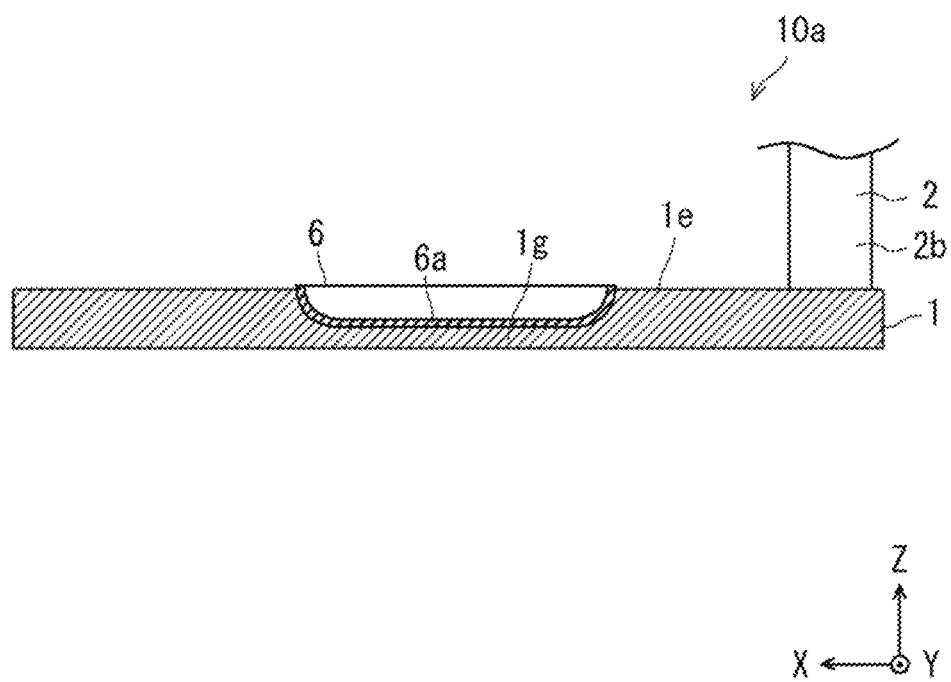
FIG. 11 is a cross-sectional view taken along a line XI-XI (see FIG. 10) showing a modified example of the commodity imaging apparatus according to the first example embodiment.

Modified Example of Commodity Imaging Apparatus According To First Example Embodiment Incidentally, there is a commodity imaging apparatus 10a shown in FIGS. 10 and 11. The commodity imaging apparatus 10a is a modified example of the commodity imaging apparatus 10 according to the first example embodiment (see FIGS. 1 to 3). FIG. 10 is a plan view showing the modified example of the commodity imaging apparatus according to the first example embodiment. FIG. 11 is a cross-sectional view taken along a line XI-XI (see FIG. 10) showing the modified example of the commodity imaging apparatus according to the first example embodiment.

The commodity imaging apparatus 10a includes a commodity placement table 1, and a placement surface 1e of the commodity placement table 1 include a recessed part 1g having a roughly rectangular shape in which the corners are roundish as viewed from above the commodity placement table 1 as shown in FIG. 10. As shown in FIG. 11, the peripheral part of the recessed part 1g is gradually recessed toward the inside of the commodity placement table 1. The peripheral part of the recessed part 1g may have a curved surface. The commodity placement table 1 includes a tray 6, and the tray 6 includes a recessed part 6a that conforms to the recessed part 1g of the placement surface 1e. The shape of the recessed part 6a may be designed so that the height of the edge of the tray 6 coincides with the height of the commodity placement table 1. A recess 1i for enabling the tray 6 to be taken out from the commodity placement table 1 is formed on each of the two short sides of the roughly rectangular recessed part 1g. Even when a commodity is placed on the tray 6 and placed on the commodity placement table 1, a shadow is less likely to be formed on the side surface of the commodity by the edge of the tray 6.

Note that a modified example of the commodity imaging apparatus 20, 30, 40 or 50 (see FIGS. 4 to 9) may include the tray 6 and the commodity placement table 1 with the recessed part 1g formed therein, but such a modified example does not necessarily have to include the light source, such as the light sources 52a and 52b, in the commodity placement table 1. That is, a modified example of the commodity imaging apparatus 20, 30, 40 or 50 that includes the tray 6 and the commodity placement table 1 with the recessed part 1g formed therein does not require the light sources 52a and 52b, so that the structure of such a modified example is simple.

Sixth Example Embodiment

Figure 12:
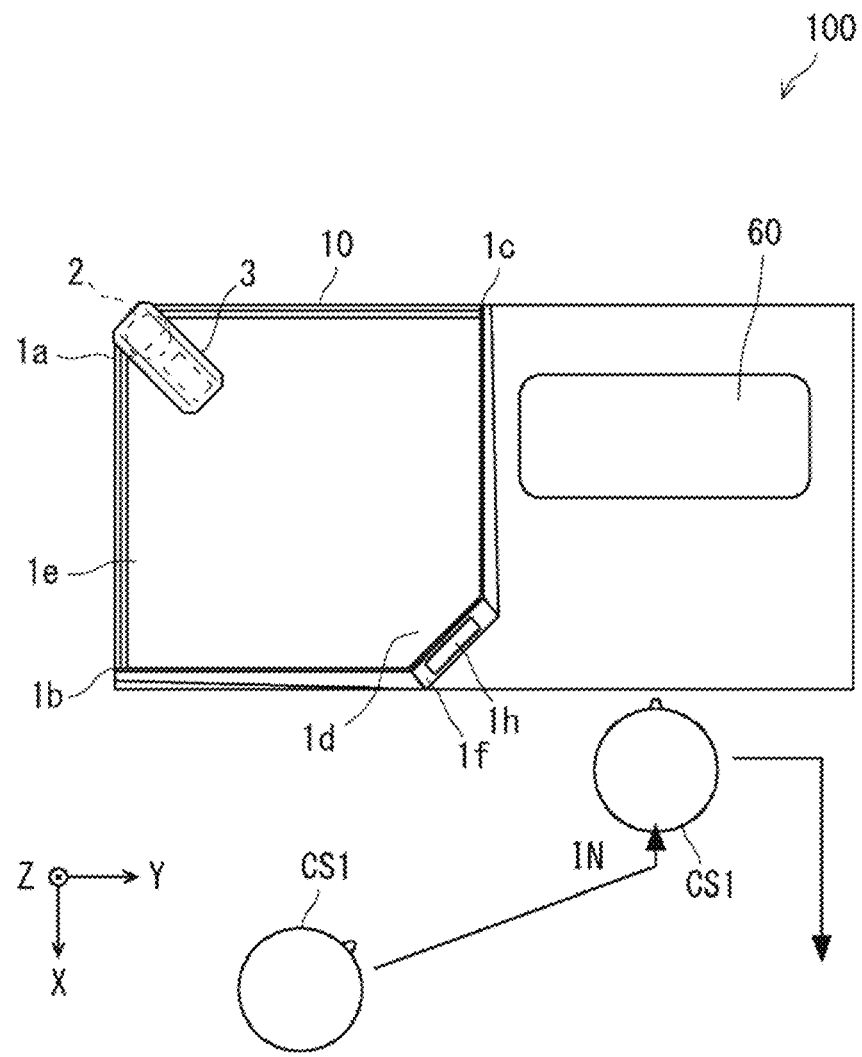
FIG. 12 is a plan view showing an example of a configuration of an image recognition POS apparatus according to a sixth example embodiment.
Figure 13:
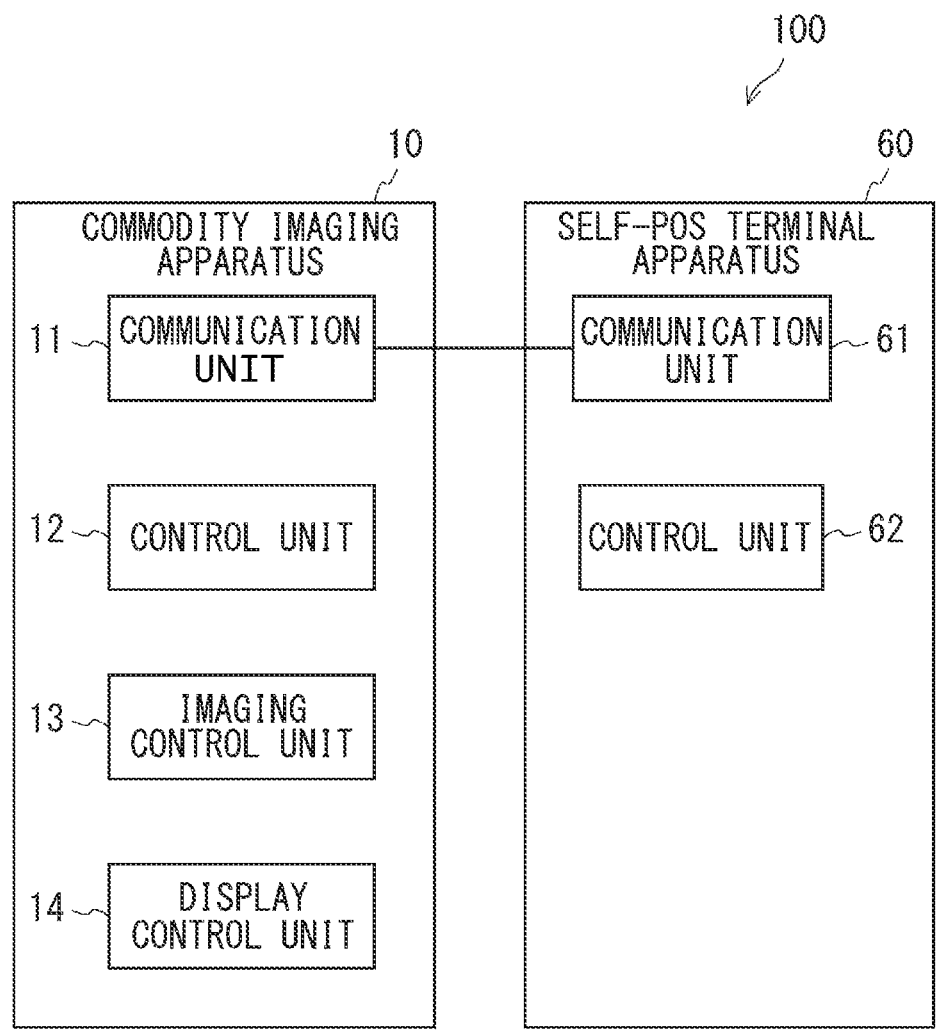
FIG. 13 is a block diagram showing a system configuration of an example of a configuration of the image recognition POS apparatus according to the sixth example embodiment.

Next, a POS image recognition apparatus according to a sixth example embodiment will be described with reference to FIGS. 12 and 13. FIG. 12 is a plan view showing an example of a configuration of an image recognition POS apparatus according to the sixth example embodiment. FIG. 13 is a block diagram showing a system configuration of an example of a configuration of the image recognition POS apparatus according to the sixth example embodiment.

As shown in FIGS. 12 and 13, the image recognition POS system 100 includes a commodity imaging apparatus 10 and a self-POS terminal apparatus 60. A display unit 1h is preferably provided in a cut-out part 1f of the commodity imaging apparatus 10. A customer can carry out a process for a settlement of commodities he/she purchases by himself/herself by using the self-POS terminal apparatus 60.

As shown in FIG. 13, the commodity imaging apparatus 10 includes, as a system configuration, a communication unit 11, a control unit 12, an imaging control unit 13, and a display control unit 14.

The self-POS terminal apparatus 60 includes, as a system configuration, a communication unit 61 and a control unit 62.

The commodity imaging apparatus 10 and the self-POS terminal apparatus 60 are connected to each other so that they can communicate with each other. For example, the communication unit 11 and the communication unit 61 communicate with each other by performing transmission and reception through a wire or wirelessly. The control unit 12 controls each operation performed by the commodity imaging apparatus 10. The control unit 12 controls each operation performed by the imaging control unit 13 and each operation performed by the imaging unit 3. In the case where the display unit 1h is provided in the cut-out part 1f, the display control unit 14 controls each operation performed by the display unit 1h. The display unit 1h displays various types of information as appropriate. The information is, for example, information indicating whether or not a cash register is currently available. Note that the control unit 62 of the self-POS terminal apparatus 60 may control each operation performed by the commodity imaging apparatus 10.

The commodity imaging apparatus 10 and the self-POS terminal apparatus 60 includes, as a hardware configuration, an interface, a processor, and a memory. The control units 12 and 62, the imaging control unit 13, and the display control unit 14 are implemented by having the processor load and execute a control program(s) stored in the memory. That is, this control program is a program for causing the processor to function as the control units 12 and 62, the imaging control unit 13, the display control unit 14, or parts of them. It can be said that this control program is a program for causing the commodity imaging apparatus 10 and the self-POS terminal apparatus 60 to perform processing in the control unit 12 or a part thereof.

As shown in FIG. 12, a customer CS1 takes an image of a commodity by using the commodity imaging apparatus 10 and thereby registers the commodity. The self-POS terminal apparatus 60 receives data output by the registration by the commodity imaging apparatus 10 through the communication unit 11 or the like, and performs a process for a settlement and the like. Note that the commodity imaging apparatus 10 may hold information about the commodity, recognize the photographed commodity, and output a result of the recognition to the self-POS terminal apparatus 60. Alternative, the commodity imaging apparatus 10 may not hold information about the commodity and output the taken imaging data to the self-POS terminal apparatus 60, and the self-POS terminal apparatus 60 may recognize the commodity. The customer CS1 leaves the image recognition POS system 100 after completing the operation for registering the commodity and paying the money therefor. Then, another customer different from the customer CS1 registers his/her commodity. In this manner, customers can, one after another, register a commodity and pay the money therefor, so that, for example, they can complete purchasing operations at the cash register. In the case where the display unit 1*h* is provided in the cut-out part 1*f*, the display unit 1*h* can notify the customer CS1 of various types of information and have the customer CS1 check the information. The display unit 1*h* shows, for example, information indicating whether or not the cash register is currently available. The customer CS1 can check the information and determine whether or not to use the cash register based on the information.

Modified Example of Sixth Example Embodiment

Figure 14:
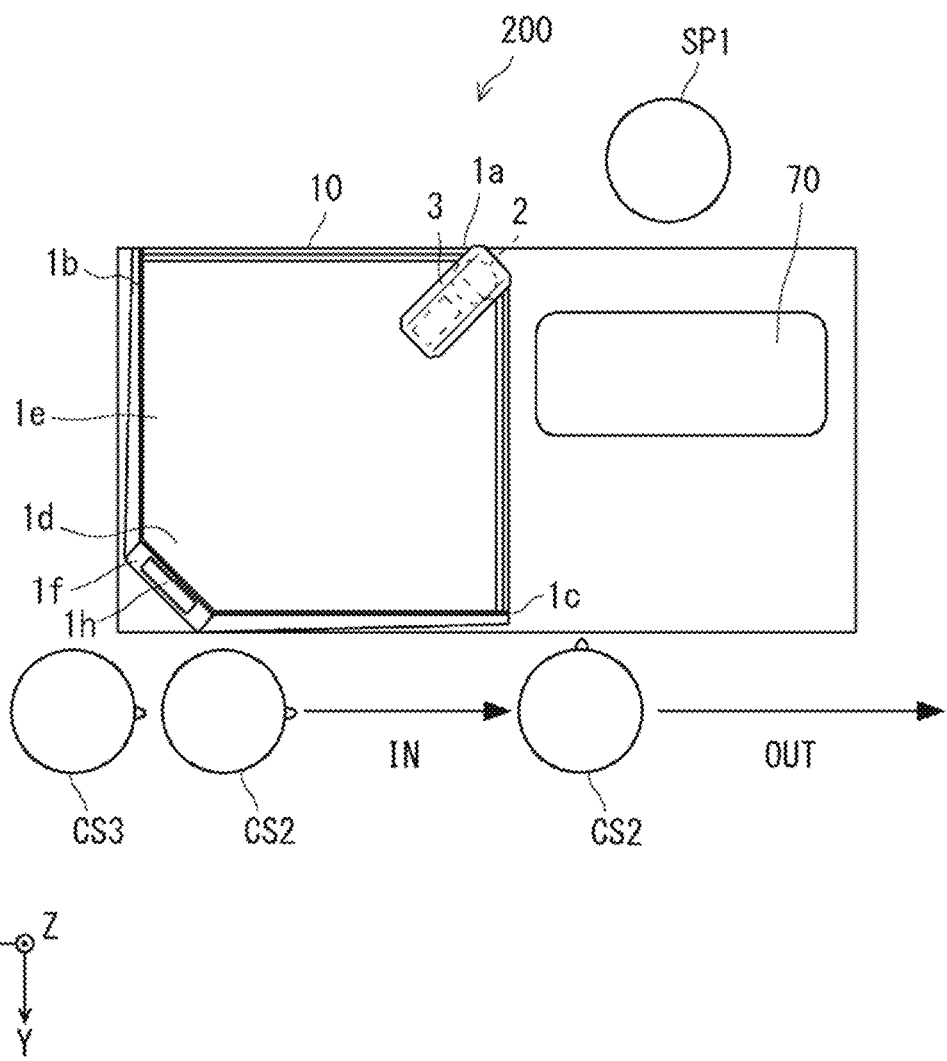
FIG. 14 is a plan view showing a modified example of the image recognition POS apparatus according to the sixth example embodiment.

Next, an image recognition POS system 200 shown in FIG. 14 will be described. The image recognition POS system 200 is a modified example of the image recognition POS system 100 according to the sixth example embodiment. FIG. 14 is a plan view showing a modified example of the image recognition POS apparatus according to the sixth example embodiment.

As shown in FIG. 14, the image recognition POS system 200 includes a commodity imaging apparatus 10 and a store-clerk POS terminal apparatus 70. A store clerk can carry out a process for a settlement of commodities purchased by a customer by using the store-clerk POS terminal apparatus 70.

Except for the display unit 1*h*, the commodity imaging apparatus 10 has the same system configuration and the same hardware configuration as those of the commodity imaging apparatus 10 of the image recognition POS system 100 shown in FIGS. 12 and 13. That is, the same apparatuses as those of the commodity imaging apparatus 10 of the image recognition POS system 100 shown in FIGS. 12 and 13 can be used. In the image recognition POS system 200, all that has to be done is to change the direction in which the commodity imaging apparatus 10 is installed.

Except for the direction in which the store-clerk POS terminal apparatus 70 is installed, the store-clerk POS terminal apparatus 70 has the same system configuration and the same hardware configuration as those of the self-POS terminal apparatus 60 shown in FIGS. 12 and 13. The store-clerk POS terminal apparatus 70 may include a customer display unit as well as a store-clerk display unit. Similarly to the communication unit 61 of the self-POS terminal apparatus 60, the communication unit (not shown) of the store-clerk POS terminal apparatus 70 reciprocally communicates with the communication unit 11 of the commodity imaging apparatus 10 by performing transmission and reception through a wire or wirelessly. Further, the control unit (not shown) of the store-clerk POS terminal apparatus 70 may control each operation performed by the commodity imaging apparatus 10.

Note that a customer CS1 takes an image of a commodity by using the commodity imaging apparatus 10 and thereby registers the commodity. The store-clerk POS terminal apparatus 70 receives data output by the registration by the commodity imaging apparatus 10 through the communication unit 11 or the like, and performs a process for a settlement or the like. Note that the commodity imaging apparatus 10 may hold information about the commodity, recognize the photographed commodity, and output a result of the recognition to the store-clerk POS terminal apparatus 70. Alternatively, the commodity imaging apparatus 10 may not hold information about the commodity and may output the taken imaging data to the store-clerk POS terminal apparatus 70, and the store-clerk POS terminal apparatus 70 may recognize the commodity. The customer CS2 leaves the image recognition POS system 200 after he/she completes the operation for registering the commodity and completes the payment therefor. Then, another customer CS3 different from the customer CS2 registers his/her commodity. In this manner, customers can, one after another, register a commodity, and for example complete purchasing operations at the cash register. In the case where the display unit 1*h* is provided in the cut-out part 1*f*, the display unit 1*h* can notify the customer of various types of information and have the customer check the information.

Note that each of the image recognition POS systems 100 and 200 includes the commodity imaging apparatus 10 according to the first example embodiment, but may instead include any one of the commodity imaging apparatuses 20, 30, 40 and 50 according to the second to fifth example embodiments. Further, each of the image recognition POS systems 100 and 200 may also include the commodity imaging apparatus 10*a* according to the modified example of the first example embodiment. Further, similarly to the commodity placement table 1 of the commodity imaging apparatus 20 of the second example embodiment, the commodity placement table 1 of the commodity imaging apparatus 10 according to the first example embodiment may include the light sources 52*a* and 52*b*, the light transmitting plate, and the light guiding plate.

Further, it is also possible to perform a commodity imaging method for taking an image of a commodity by using the commodity imaging apparatus 10, 10*a*, 20, 30, 40 or 50. Specifically, the commodity imaging method includes a step of placing a commodity G1 on a roughly square placement surface 1*e*, and a step of taking an image of the commodity G1 obliquely above the commodity G1 by using an imaging unit 3 disposed above one corner 1*a* of the roughly square placement surface 1*e*. Various modifications can be made to the commodity imaging method. For example, a step of disposing the imaging unit 3 in an upper part of a support pillar 2 may be added between the above-described two steps.

Note that the present invention is not limited to the above-described example embodiments and may be modified as appropriate without departing from the spirit and scope of the invention.

Although the present invention is explained above with reference to embodiments, the present invention is not limited to the above-described embodiments. Various modifications that can be understood by those skilled in the art can be made to the configuration and details of the present invention within the scope of the invention.

This application is based upon and claims the benefit of priority from Japanese patent application No. 2018-207915, filed on Nov. 5, 2018, the disclosure of which is incorporated herein in its entirety by reference.

REFERENCE SIGNS LIST 10, 10a, 20, 30, 40, 50 COMMODITY IMAGING APPARATUS
1 COMMODITY PLACEMENT TABLE
1a, 1b, 1c, 1d CORNER
1e PLACEMENT SURFACE
1f CUT-OUT PART
1g RECESSED PART
1h DISPLAY UNIT
1i RECESS
2 COLUMN
2a TIP PART
2b BASE PART
2c INTERMEDIATE PART
2d CONNECTOR
3 IMAGING UNIT
4a, 4b WALL-LIKE PART
4aa, 4ab, 4ac, 4ba, 4bb, 4bc CORNERS
4ad, 4bd CURVED PART
4c REFLECTING SURFACE
6 TRAY
6a RECESSED PART
11 COMMUNICATION DEPARTMENT
12 CONTROL UNIT
13 IMAGING CONTROL UNIT
14 DISPLAY CONTROL UNIT
31 CAMERA
32 CABLE
33 CASE
41 LIGHT SHIELDING PLATE
42 LIGHT GUIDING PLATE
43 LIGHT TRANSMITTING PLATE
41c CONCAVE CURVED-SURFACE PART
42c CONVEX CURVED-SURFACE PART
43c INCLINED FLAT-SURFACE PART
44c FLAT-SURFACE PART
51a, 51b, 52a, 52b, 53a, 53b LIGHT SOURCE
60 SELF-POS TERMINAL APPARATUS
61 COMMUNICATION UNIT
62 CONTROL UNIT
70 STORE-CLERK POS TERMINAL APPARATUS
100, 200 IMAGE RECOGNITION POS SYSTEM
A1 IMAGING RANGE
G1 COMMODITY

What is claimed is:

1. A commodity imaging apparatus comprising:
a commodity placement table comprising a roughly square placement surface;
a support pillar disposed at one corner of the placement surface;
an imaging unit disposed in the support pillar so as to take an image of a commodity placed on the placement surface from obliquely above the commodity;
a first light source is provided in a wall-like part,
wherein the commodity placement table comprises the wall-like part;
the wall-like part extends so as to vertically extend upward from two sides forming the one corner, and blocks external light,
the first light source provides light through the wall-like part, the wall-like part includes a light guiding plate, and the light guiding plate is composed of a plate that uniformly surface-emits light using light that is emitted from the first light source and enters the light guiding plate from the end face thereof.

2. The commodity imaging apparatus according to claim 1, wherein
the wall-like part is composed of a roughly quadrangular plate, and includes three corners, and a curved part,
the one corner of the wall-like part is in contact with the one corner of the placement surface, and
the curved part is disposed at a position corresponding to a corner of the roughly rectangular plate diagonally opposite to the corner of the wall-like part, and roundish.

3. The commodity imaging apparatus according to claim 1, wherein
a second light source is provided on an imaging unit side of the wall-like part,
a reflecting surface is provided on a placement surface side of the wall-like part,
the second light source provides light onto the reflecting surface of the wall-like
the reflecting surface reflects the provided light toward a side surface of the commodity placed on the placement surface.

4. The commodity imaging apparatus according to claim 3, wherein the reflecting surface comprises a concave curved-surface part, a convex curved-surface part, or an inclined flat-surface part.

5. The commodity imaging apparatus according claim 1, wherein
the commodity placement table comprises a light source inside the commodity placement table, and
the light source inside the commodity placement table is disposed inside the commodity placement table and provides light through the placement surface.

6. The commodity imaging apparatus according to claim 1, wherein a recessed part having a height equal to that of a tray is formed in the commodity placement table, the tray being configured to be placed on the commodity placement table with a commodity placed thereon.

7. The commodity imaging apparatus according to claim 1, wherein a display unit is provided at a corner opposite to the corner where the support pillar is disposed.

8. A commodity imaging method comprising:
placing a commodity on a roughly square placement surface; and
taking, by using an imaging apparatus disposed above one corner of the roughly square placement surface, an image of the commodity from obliquely above the commodity, in a state that a wall-like part extends so as to vertically extend upward from two sides forming the one corner and blocks external light,
wherein a first light source is provided in the wall-like part, the first light source provides light through the wall-like part, the wall-like part includes a light guiding plate, and the light guiding plate is composed of a plate that uniformly surface-emits light using light that is emitted from the first light source and enters the light guiding plate from the end face thereof.

9. An image recognition POS system comprising:
a commodity imaging apparatus; and
a POS terminal apparatus connected to the commodity imaging apparatus through a wire or wirelessly so as to be able to communicate with the commodity imaging apparatus, the POS terminal apparatus being configured to perform a process for a settlement of a commodity purchased by a customer, wherein
the commodity imaging apparatus comprises:
a commodity placement table comprising a roughly square placement surface;

a support pillar disposed at one corner of the placement surface;
an imaging unit disposed in the support pillar so as to take an image of a commodity placed on the placement surface from obliquely above the commodity; and
a first light source is provided in a wall-like part,
wherein the commodity placement table comprises the wall-like part,
the wall-like part extends so as to vertically extend upward from two sides forming the one corner, and blocks external light,
the first light source provides light through the wall-like part,
the wall-like part includes a light guiding plate, and
the light guiding plate is composed of a plate that uniformly surface-emits light using light that is emitted from the first light source and enters the light guiding plate from the end face thereof.

\* \* \* \* \*